2,766,280

PREPARATION OF PHTHALIC ACIDS

Ferdinand B. Zienty, Brentwood, and Marshall C. Freerks, Kirkwood, Mo., assignors to Monsanto Chemical Company, St. Louis, Mo., a corporation of Delaware No Drawing. Application November 20, 1952, Serial No. 321,743

11 Claims. (Cl. 260—524)

This invention relates to the oxidation of alkyl side chains on an aromatic nucleus and more specifically pertains to an improved process for the oxidation of each of the methyl groups of xylenes to carboxy groups.

Heretofore it has been proposed that toluic acids be prepared by the oxidation of xylenes with nitric acid under various reaction conditions according to the processes employed to oxidize toluene to benzoic acid. However, no commercially acceptable process for the oxidation of toluic acids to phthalic acids has been heretofore described.

When a xylene and nitric acid are heated together at atmospheric pressure, the nature of the resulting reaction is dependent upon the concentration of the nitric acid employed. Moreover, when an excess of nitric acid of a concentration of 50% or less is heated with xylene at atmospheric pressure a constant boiling mixture of xylene and water is formed, boiling at about 90° C. Thus when these conditions are employed in an attempt to axidize xylene, the constant boiling mixture imposes a limitation upon the reaction temperature causing the oxidation of xylene to toluic acid to proceed very slowly. When toluic acid and dilute or concentrated nitric acid are heated together at atmospheric pressure, the maximum reaction temperature obtainable is limited to the boiling point of the particular nitric acid composition employed which in any case is too low to accomplish the oxidation of toluic acid to phthalic acid.

Other methods which have been employed in oxidizing toluic acids to phthalic acids comprise employing permanganates and dichromates as the oxidizing agents. These processes have not as yet been found to be acceptable for industrial practice.

Furthermore, even though toluic acids have been prepared by other methods, it has been virtually impossible to further oxidize the toluic acids to phthalic acids with nitric acid at atmospheric pressure. This is especially true in the case of p-toluic acid. For example, p-toluic acid can be refluxed with nitric acid with a concentration as as high as 70% at atmospheric pressure for days and still there will be no detectable quantity of terephthalic acid in the reaction medium.

It is an object of this invention to provide an improved process for the successive oxidation of each of the methyl groups of xylene with nitric acid. It is also an object of this invention to provide an improved process for preparation of toluic acids by a rapid oxidation of xylenes with nitric acid at atmospheric pressure. It is a further object of this invention to provide an improved process for the preparation of phthalic acids by the oxidation of the second methyl group of xylenes, i. e., the oxidation of the methyl group of toluic acids, with nitric acid. It is an additional object of this invention to provide a process whereby terephthalic acid can be prepared by the oxidation of p-toluic acid with nitric acid even at atmospheric pressure. Additional objects will become apparent from a description of the novel process of this invention.

The above objects can be accomplished by the slow addition of nitric acid to xylene at a temperature which approximates the boiling point of the xylene employed while removing water from the reaction by distillation whereby substantially all of the xylene is converted to the corresponding toluic acid. Then the reaction temperature is increased to a temperature greater than 140° C. to maintain the toluic acid formed in a molten state and the slow addition of nitric acid and removal of water by distillation are continued. According to this process there is present at any increment of time only a small quantity of nitric acid. It might be assumed that the resulting oxidation would be slow and time consuming. However, this is not at all the case, as will be hereinafter demonstrated, for oxidation takes place as soon as the nitric acid contacts the hot surface in the reactor. Thus the oxidation progresses quite rapidly throughout. For example, a xylene can be converted to its corresponding toluic acid with substantially quantitative yields in but a few hours whereas the oxidation of toluene to benzoic acid by refluxing toluene with nitric acid at atmospheric pressure is reported by the prior art as requiring many days of refluxing. The oxidation in the second step also progresses quite rapidly even though only a very small quantity of nitric acid is present at any one time. The process of this invention is unusual in another respect in that no phthalic acid is produced while there is xylene present to be oxidized.

The process of this invention is quite flexible. One can start with a xylene and oxidize with the same techniques through to a phthalic acid by a two step process or one can start with a toluic acid and oxidize to phthalic acid or one can stop the oxidation of xylene at the end of the first step and obtain a quite pure toluic acid. Of course, if a toluic acid is the desired product, the reaction is stopped after the first oxidation step is completed which is indicated by a distinct sharp increase in temperature in the reactor to above 140° C. If the oxidation process of this invention is only carried out to this end point, there can be obtained substantially quantitative yields of the desired toluic acids in but a few hours without the use of excessive quantities of nitric acid and with a complete elimination of the dangers inherent in a process where large quantities of hot nitric acid are present.

The continued slow addition of nitric acid to the molten toluic acid formed causes the hitherto exceedingly difficultly oxidable methyl group of toluic acids, especially that of p-toluic acid, to become oxidized to a second carboxy group at atmospheric pressure. In this second step in the oxidation of p-xylene to terephthalic acid, the phthalic acid first separates from the reaction mixture as a solid and the reaction mixture becomes an increasingly thick slurry until about 25% of the p-toluic acid is converted to terephthalic acid. At this point the reaction mixture solidifies and oxidation ceases. The terephthalic acid is recovered from the solid mass and the toluic acid returned for further oxidation.

For the preparation of phthalic acids from xylenes the most preferred process of this invention comprises heating the xylene to a temperature above 100°·C., and more advantageously from about 120° C. to approximately the boiling point of xylene, and slowly adding nitric acid while removing water by distillation thereby forming a toluic acid. The toluic acid is heated to a temperature greater than 140° C. but below the decomposition point of the reaction mixture while continuing the slow addition of the nitric acid and the removal of water by distillation until the oxidation ceases.

In both steps of the novel process of this invention nitric acid is slowly added to the reactor. This slow addition can be accomplished in any one of several ways. For example, the nitric acid can be added dropwise, in a slow steady stream, an intermittent stream or as regularly injected portions throughout the reaction. In any case, the rate of addition of nitric acid should not substantially exceed its rate of consumption. Either dropwise or slow stream addition of nitric acid is preferred because by either of these means of addition the accumulation of hot nitric acid in the reaction equipment is completely eliminated. The slow addition of the nitric acid, i. e. no faster than it is consumed, results in a substantially instantaneous reaction as soon as the acid hits the hot surface in the reactor. Thus the water charged with the acid as well as the water formed by the oxidation flash off substantially as rapidly as formed. By adding the nitric acid at a rate substantially equal to its rate of consumption the first step will require approximately two moles of nitric acid per mole of xylene charged and the second step will require two moles per mole of toluic acid oxidized. Of course, an amount of nitric acid in excess of two moles per mole of xylene charged can be employed in the first step, but such a practice obviously would offer no significant advantage since the excess nitric acid would have to be removed from the reaction equipment and be recovered.

The concentration of nitric acid which can be employed in the process of this invention can be varied substantially. Aqueous nitric acid solutions which can be successfully used in this process range from those containing from about 30% by weight of nitric acid to those containing as much as about 70% by weight of nitric acid which is above the usual oxidizing concentrations and borders on the nitrating concentrations of nitric acid. Even when 70% nitric acid is employed, nitration products are not formed in either step of the process.

During both steps of the process of this invention water is removed from the reaction by distillation. This water removed includes the water added with the aqueous nitric acid and the water formed during the oxidation process. Consequently, it is advantageous to employ the most concentrated oxidizing nitric acid solutions so that the water can be removed as rapidly as possible. The slow addition of nitric acid with the almost instantaneous reaction in each step facilitates the rapid removal of water. The temporary accumulation of water in the reaction system when the addition of nitric acid is intermittent will, of course, decrease the reaction temperature and retard the operation of the process slightly. However, even under these conditions, p-toluic acid can be oxidized to terephthalic acid at atmospheric pressure since the water accumulation is only temporary.

The following specific examples are not intended as limitations on the process of this invention but rather are presented to illustrate the most preferred embodiment of this invention.

*Example I*

100 ml. of p-xylene are charged into a three-necked, 500 ml. flask fitted with a fractionating column, a separator with a return system and an efficient stirrer. The xylene is heated to a temperature of approximately 130°–140° C. and then with constant agitation, 80 ml. of 70% nitric acid is added dropwise over a period of approximately three hours. The water added with the nitric acid and the water formed during the reaction is removed by distillation during the addition of the nitric acid.

At the end of this reaction period, the temperature of the reaction mixture is raised to about 170°–185° C. and then with constant agitation, 35 ml. of 70% nitric acid is added dropwise over a period of about one hour while water is removed by distillation. At this point a solid mass forms in the reactor and reaction ceases. The reaction mixture thus obtained contains about 25% terephthalic acid.

Ortho-xylene, meta-xylene, a mixture containing meta- and para-xylene or a mixture containing all three isomeric xylenes can be employed in the process set forth in Example I to convert the xylene or mixtures of xylenes to the corresponding phthalic acid or mixtures of phthalic acids.

Even though the yield obtained in Example I is 25%, it would be acceptable for industrial practice over a process which required superatmospheric pressures for terephthalic acid can be readily recovered from p-toluic acid according to methods known to the art.

The following example illustrates the preparation of substantially quantitative yields of toluic acids by oxidizing xylenes according to the process of this invention.

*Example II*

200 ml. of p-xylene is charged into a three-necked, 500 ml. flask fitted with a fractionating column, an efficient stirrer and a separator with a return system. Xylene is heated to a temperature of approximately 135°–140° C. and then with constant agitation, 80 ml. of 70% nitric acid is added dropwise over a period of approximately three hours while water is removed by distillation during the addition of the nitric acid.

At the end of the reaction period, a small amount of unreacted xylene in the system is driven from the reaction equipment leaving behind a substantially quantitative yield, based upon the consumed xylene and the nitric acid utilized, of substantially pure p-toluic acid. At no time during the reaction is there an accumulation of unreacted nitric acid, for the nitric acid is consumed substantially as soon as it contacts the hot surface.

The procedure set forth in Example II can be employed to convert m-xylene, o-xylene, a mixture of m- and p-xylene or a mixture containing all three of the isomeric xylenes to the corresponding toluic acids or mixtures of toluic acids in excellent yields in short reaction time cycles.

The following example illustrates the novel process of this invention where toluic acid is the starting material.

*Example III*

125 g. of p-toluic acid are charged into a three-necked, 500 ml. flask fitted with a fractionating column, a separator with a return system and an efficient stirrer. The toluic acid is heated to a temperature of about 170°–185° C. and with constant agitation, 35 ml. of 70% nitric acid is added dropwise over a period of about one hour. The reaction mixture thus obtained contains about 25% terephthalic acid.

The procedure set forth in Example III can be utilized to convert o-toluic acid, m-toluic acid, a mixture of m- and p-toluic acid or a mixture of all three isomeric toluic acids to the corresponding phthalic acids or mixtures of phthalic acids.

The quantity of toluic acid utilized in the novel process described in Example III is subject to substantial variation. Generally, however, a considerable excess of toluic acid is advisable. The phthalic acids formed in this process are insoluble in the toluic acid utilized. As described in Example III, the reaction is generally continued until solidification of the reaction mass with the accompanying cessation of the oxidation reaction. However, the reaction may be stopped at any intermediate point while the mixture is still a fluid slurry. After the reaction has been stopped, phthalic acid may be recovered therefrom by any suitable method. For example, terephthalic acid can be recovered from a mixture containing terephthalic acid and p-toluic acid by the process described in U. S. Patent No. 2,572,575 issued October 23, 1951.

This application is a continuation-in-part of copending applications Serial No. 228,745, Serial No. 228,746 and Serial No. 228,747, all filed May 28, 1951, all now abandoned.

What is claimed is:

1. In a process for the preparation of phthalic acids by the oxidation of a xylene, the steps comprising slowly adding nitric acid to a xylene while maintaining a temperature of from about 120° C. to approximately the boiling point of xylene and while removing water by distillation thereby forming a toluic acid, and then slowly adding nitric acid to the toluic acid maintained at a temperature greater than about 140° C. while removing water by distillation, said steps being carried out at atmospheric pressure.

2. In a process for the preparation of a phthalic acid by the oxidation of a xylene, the steps comprising slowly adding nitric acid having a concentration of from about 30% to about 70% $HNO_3$ to a xylene while maintaining a temperature at approximately the boiling point of xylene and while removing water by distillation, thereby forming a toluic acid, and then slowly adding nitric acid having a concentration of from about 30% to about 70% $HNO_3$ to the toluic acid maintained in a fluid state at a temperature greater than about 140° C. while removing water by distillation, said steps being carried out at atmospheric pressure.

3. In a process for the preparation of a phthalic acid by the oxidation of xylene, the steps comprising slowly adding nitric acid having a concentration of from about 30% to about 70% $HNO_3$ to a xylene while maintaining a temperature in the range of from about 120° C. to about the boiling point of the xylene and while removing water by distillation, thereby forming a toluic acid, and then slowly adding nitric acid having a concentration of from about 30% to about 70% $HNO_3$ to the toluic acid maintained in a fluid state at a temperature greater than about 140° C. while removing water by distillation, said steps being carried out at atmospheric pressure.

4. In a process for the preparation of terephthalic acid by the oxidation of p-xylene, the steps comprising adding nitric acid having a concentration of from about 30% to about 70% $HNO_3$ at a rate approximately equal to its rate of consumption to p-xylene while maintaining a temperature in the range of about 120° C. to about the boiling point of the xylene and while removing water by distillation, thereby forming p-toluic acid, and then adding nitric acid having a concentration of from about 30% to about 70% $HNO_3$ at a rate approximately equal to its rate of consumption to molten p-toluic acid maintained at a temperature greater than about 140° C. while removing water by distillation; said steps being carried out at atmospheric pressure.

5. The process comprising slowly adding nitric acid to molten toluic acid at a temperature above 140° C. and at atmospheric pressure while removing water by distillation until oxidation ceases thereby forming a mixture containing a phthalic acid and recovering said phthalic acid.

6. The process comprising slowly adding nitric acid having a concentration of from about 30% to about 70% $HNO_3$ to molten toluic acid at a temperature above 140° C. and at atmospheric pressure while removing water by distillation until the oxidation ceases thereby forming a mixture containing a phthalic acid and recovering said phthalic acid.

7. The process comprising slowly adding nitric acid having a concentration of from about 30% to about 70% $HNO_3$ to molten p-toluic acid at a temperature above 140° C. and at atmospheric pressure while removing water by distillation until the reaction mass solidifies thereby forming a mixture containing terephthalic acid and recovering the terephthalic acid.

8. The process comprising adding nitric acid having a concentration of from about 30% to about 70% $HNO_3$ at a rate substantially equal to the rate of consumption thereof to molten p-toluic acid at a temperature above 140° C. and at atmospheric pressure while removing water by distillation until the reaction mass solidifies thereby forming a mixture containing terephthalic acid and recovering the terephthalic acid.

9. In a process for preparing a phthalic acid by the oxidation of a toluic acid, the steps comprising slowly adding nitric acid having a concentration of from about 30% to about 70% $HNO_3$ to molten toluic acid at a temperature above 140° C. and at atmospheric pressure while removing water by distillation.

10. In a process for preparing a phthalic acid by the oxidation of a toluic acid, the steps comprising slowly adding nitric acid at a rate substantially equal to the rate of consumption thereof to molten toluic acid at a temperature above 140° C. and at atmospheric pressure while removing water by distillation.

11. In a process for preparing terephthalic acid by the oxidation of p-toluic acid, the steps comprising adding nitric acid having a concentration of from about 30% to about 70% $HNO_3$ at a rate substantially equal to the rate of consumption thereof to molten toluic acid at a temperature above 140° C. and at atmospheric pressure while removing water by distillation.

References Cited in the file of this patent

UNITED STATES PATENTS

| 1,488,730 | Beall et al. | Apr. 1, 1924 |
| 2,636,899 | Burrows et al. | Apr. 28, 1953 |

FOREIGN PATENTS

| 494,439 | Belgium | Mar. 31, 1950 |